(No Model.)
C. S. COMINS.
DEVICE FOR HEATING AND BOILING.
No. 246,727.  Patented Sept. 6, 1881.
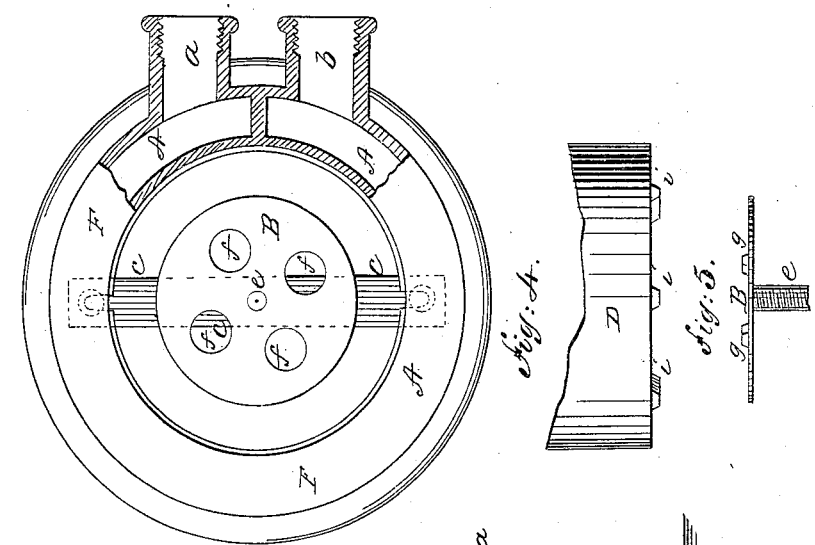
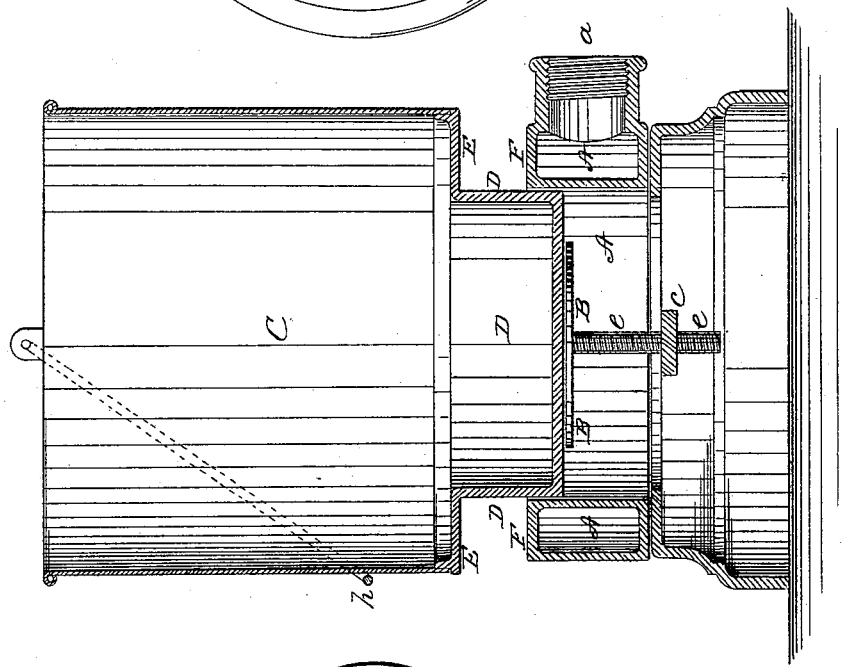
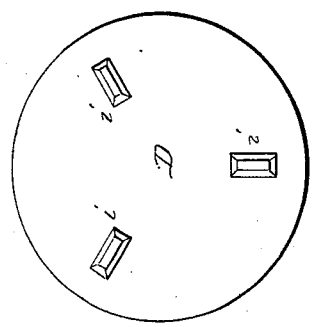
Witnesses.
Inventor:
Charles S. Comins,
by
Attorney.

UNITED STATES PATENT OFFICE.

CHARLES S. COMINS, OF BOSTON, MASSACHUSETTS.

DEVICE FOR HEATING AND BOILING.

SPECIFICATION forming part of Letters Patent No. 246,727, dated September 6, 1881.

Application filed May 31, 1881. (No model.)

*To all whom it may concern:*

Be it known that I, CHARLES S. COMINS, of Boston, in the county of Suffolk and State of Massachusetts, have invented a new and Improved Heating and Boiling Device; and I do hereby declare that the following is a full, clear, and exact description of the same, reference being had to the accompanying drawings, making part of this specification.

This invention is in the nature of an improvement in heating and boiling devices; and the invention consists in a vessel for heating and boiling, in combination with an unbroken hollow annular base, within which is placed a vertically-adjustable table to support the pit of the bottom of the vessel.

In the accompanying sheet of drawings, Figure 1 represents a vertical section of my improved heating device; Fig. 2, a plan or top view, partly in section, of the base of my device; Fig. 3, a view of the bottom of the pit of vessel, showing projections; Fig. 4, a detail side view of pit, and Fig. 5 a side view of modified table.

Similar letters of reference indicate like parts in the several figures.

This invention more particularly relates to improvements on the heating devices heretofore patented by me on the 22d day of June, 1880; and the improvements consist, mainly, in constructing the heating-base A in the form of a closed or unbroken hollow annulus, into which enters a pipe, *a*, for the admission of steam, and a pipe, *b*, for its exit, so that a rapid circulation of live steam may be maintained within the annular base. Within this annular base is fixed a bridge, *c*, with a threaded hole centrally formed therein, into which hole is received a threaded stem, *e*, the upper end of this stem having secured to it a table, B, which table may have openings *f* made in it, or its surface may be provided with projections *g*, Fig. 5.

Now, to make use of my heating device when constructed substantially as described, the vessel C is placed on the annular base A, with the pit D of its bottom entering into the annular space of the base and the shoulder E of the bottom resting on the surface F of the base. Now, steam being admitted to the base through the pipe *a*, the base will become heated and the substance in the vessel C be correspondingly heated; but if it is desired to maintain the substance in the vessel C at a given temperature, whether it be of boiling-heat or a less degree, this degree of temperature may be regulated by simply turning the vessel C by its bail *h* around, so that the pit D on its bottom revolves within the annular base, and by so doing projections *i* on the bottom of the pit D will enter into the holes *f* of the table B, or be brought in contact with corresponding projections *g* on the upper surface of this table, causing the table to advance or be raised, and thereby elevate not only the pit D out of the annular opening of the base, but also raise the shoulder E of the bottom of the vessel C from contact with the upper surface, F, of the base A, and by admitting air more or less between this shoulder E of the vessel and the surface F of the base, and also between the outer surface of the pit D of the bottom and the inner surface of the annulus, the degree of heat to be imparted to the vessel C and its contents is easily regulated, for by simply turning the vessel C to the right, in the manner before stated, it is raised more or less from the base, and by turning it to the left it is caused to enter more or less into this base, and the stratum of air between the bottom of the vessel and the base is in this manner increased or diminished.

Instead of constructing the table B so as to be lowered or raised by revolving it, it is obvious that the lowering and raising of this table may be accomplished by any simple mechanical contrivance that will effect the same result, such as a sliding movement.

Having thus described my invention, what I claim as my invention, and desire to secure by Letters Patent, is—

1. A vessel for heating and boiling substances, in combination with a hollow annular base provided with inlet and outlet steam-pipes, and an adjustable supporting-table within the annulus to support the pit of the bottom of the vessel, substantially as and for the purpose described.

2. In a device for heating and boiling substances, an adjustable revolving table fitted within the annulus of a heating-base, and constructed to be elevated or lowered by the rotation of a superimposed vessel, substantially as described.

CHARLES S. COMINS.

Witnesses:
GEORGE H. REED,
CHAS. ROBINSON, Jr.